United States Patent [19]

Guignard et al.

[11] 4,163,157

[45] Jul. 31, 1979

[54] DATA MEDIUM SCANNING PROCESS AND APPARATUS

[75] Inventors: Claude F. Guignard, Plessis-Robinson, France; Bernard J. Perrette, 2 Hameau des Colombes, Domaine, St. Francois d'Assise, 78 La-Celle-Saint-Cloud, France

[73] Assignees: Traitement de l'Information et Techniques Nouvelles, Morangis; Banque de France, Paris; Bernard Julien Perrette, La-Celle-Saint-Cloud, all of France

[21] Appl. No.: 820,643

[22] Filed: Aug. 1, 1977

[30] Foreign Application Priority Data

Jul. 30, 1976 [FR] France ............................... 76 23424

[51] Int. Cl.² ........................................... G01N 21/30
[52] U.S. Cl. ................................. 250/561; 356/400
[58] Field of Search .............................. 235/470, 471; 340/146.3 H; 356/172, 71; 250/548, 549, 557, 561

[56] References Cited

U.S. PATENT DOCUMENTS

| 3,718,823 | 2/1973 | Niikura et al. | 250/561 |
| 3,774,014 | 11/1973 | Berler | 250/557 |
| 3,902,047 | 8/1975 | Tyler | 235/471 |

Primary Examiner—David C. Nelms
Attorney, Agent, or Firm—A. W. Breiner

[57] ABSTRACT

Data medium scanning process and apparatus with compensation for positioning errors and dimensional variations. The invention relates to correcting the scanning of a data medium as a function of its position or dimensional errors. It relates to apparatus which receives signals corresponding to the position of a benchmark point and to the skew of a benchmark straight-line of data medium and then computes the coordinates of the scanning lines and of their skew and consequently controls certain deflectors ensuring the desired scanning. The invention exhibits particular utility in the verification of paper money such as bank notes.

14 Claims, 9 Drawing Figures

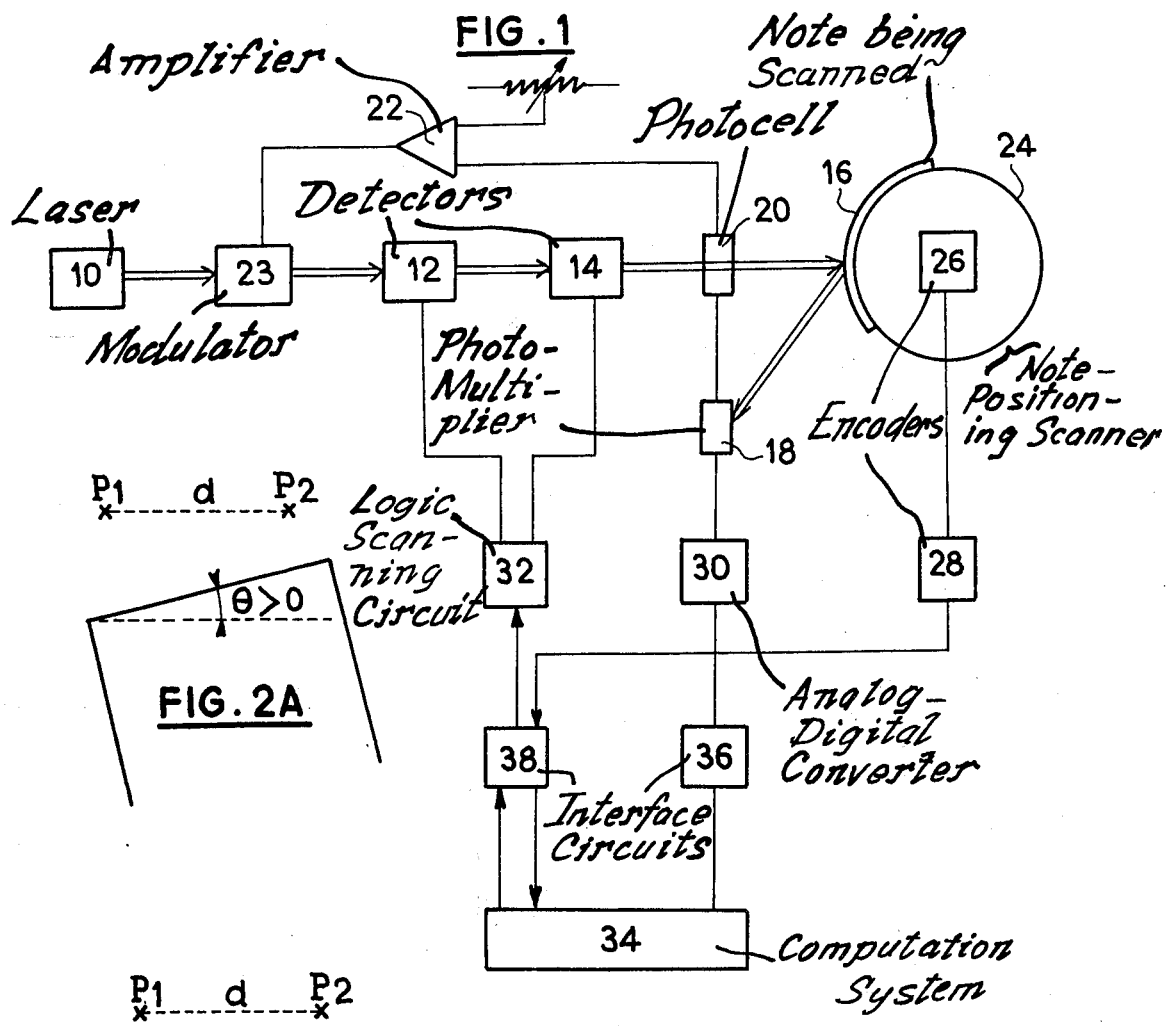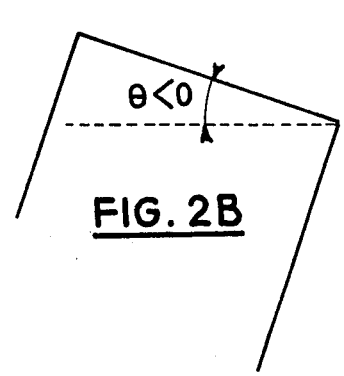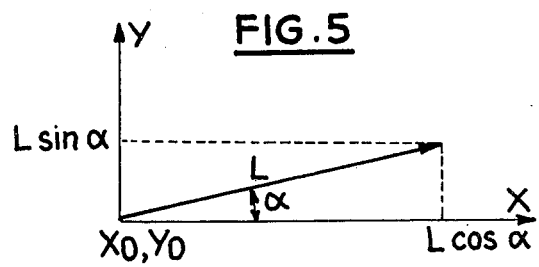

DATA MEDIUM SCANNING PROCESS AND APPARATUS

The present invention relates to scanning equipment and processes of the kind used for reading or writing data off or on a data medium. Reading or writing data by scanning a medium, for instance by means of a light ray, is often resorted to in the field of data acquisition or exchange between several systems. However, the scanning must meet certain criteria, and frequently it must begin and/or terminate at definite locations of the medium or else must follow a well defined scanning direction.

The application of the process and apparatus of the invention is here given to the special case of verifying paper money, this being one of the most difficult problems in this field. However, the invention applies also to other fields, particularly those which require only the measurement of one of the several parameters which must be considered in the course of verifying the paper money.

When bank notes or other paper money are verified, they are placed consecutively on a transport, for instance a cylinder on which they are kept by suction. Such placement may be relatively imprecise, that is, every bill may be more or less offset both circumferentially and axially and further may be skew with respect to the cylinder axis. Also, the bills or notes may be of variable dimensions due, for example, to variations in atmospheric humidity. Therefore, when verifying a series of paper notes or bills only the vignette, that is, the printed design, engraving, or drawing must be checked. Further, it must be checked entirely from one side to the other, both longitudinally and transversely, and along definite directions so that the obtained values from the reading or scanning may be compared to those of a standard bill. The comparison operations may be carried out as described in French Pat. No. 72.27445 filed July 28, 1972 under the title "Equipment For Document Inspection, Particularly Banknotes."

Thus, a bill presented to the scanning equipment for reading and inspecting the bill's traits may suffer position offsets both laterally and longitudinally, and also exhibit some skew with respect to the direction of the lines and variations in the bill's width and length, due for instance to hygrometric changes. Nevertheless, each definite point on the bill must be compared with the corresponding one of the standard bill at high precision. This comparison is effected not in all-or-nothing manner, but according to a certain number of levels, for instance sixteen levels, therefore requiring highly accurate localization in view of the small size of the analyzed points.

Processes and equipment for scanning the parallel lines of a movable medium using a beam are already known, which ensure precise measurement of the position and of the medium skew by means of two benchmarks in this medium, the scanning being controlled so that the scanned field agree with the medium position. Thus, U.S. Pat. Nos. 3,337,766 and 3,885,229 describe cathode-ray tube scanners. The article "Scanner Control System" by G. A. Garry and D. Malaby in the *IBM Technical Disclosure Bulletin*, Volume 8, #8, January 1966, describes the control of an x-y scan of a cathode-ray tube. However, it must be noted that the best cathode-ray tubes at the present time allow only a speed of 10 microns a microsecond when operating in transparency and with a single color.

Therefore, equipment and processes which compensate for the offset positions in the longitudinal and lateral directions, for the skew with respect to the line direction and for dimensional variations, are known. The application under consideration, namely to verify paper money, bills, etc., requires a scanning speed of the order of 1,000 microns a second and equipment operating by reflection and in three colors. This magnitude of 1,000 microns a second is inferred from the values stated in the above-cited French patent application for the speed of the paper money and for the dimensions of the analyzed zones.

It is clear, therefore, that the known cathode-ray tube x-y scanners are unsuitable to this application.

The apparatus and process of this invention allow compensation for those offsets, skews, and variations in dimensions, but it should be noted that depending on the application of this equipment, only the offsets, or only the skew, or only dimensional variations or any combinations of these parameters may require compensation. Therefore, equipment and a process will be described below which essentially allow scanning as a function of the bill's position on the transport and of the bill's skew with respect to its motion while being inspected. Thereafter a more general apparatus is considered, which allows compensating dimensional variations (length and width) in the data medium, for instance the engraving of the paper money.

The invention more particularly relates to a parallel line scan of a moving medium by means of a beam, comprising moving the medium at a given speed, the measurement of two coordinates of the medium benchmark point at a given time with respect to the two coordinates of a fixed reference point, measuring the skew of a benchmark direction of the moving medium with respect to a fixed reference direction, the computation by means of measured coordinates and skew on one hand of the coordinates of the origins of the scanning lines and on the other of the skew of these lines, and the control scanning so that the consecutive lines begin at the origins with the computed coordinates, and of the computed skew.

The process may also include measuring at least one dimension of the moving medium, the obtained values being used in the computational stage of the coordinates of the scanning lines of their skew.

Coordinate measurement may be carried out by partial masking of one line of detectors. Skew measurements may be achieved by counting a number of pulses representative of the displacement of the moving medium between the masking of two detectors placed in directions essentially perpendicular to that of the medium motion.

Scanning control is obtained by creating two kinds of signals reaching two elements of the apparatus for deflecting a scanning beam into essentially orthogonal directions.

The invention also relates to parallel line scanning of a moving medium by means of a beam by implementing a process of the described type. This equipment comprises a medium transport, a measuring system to form signals representative of two coordinates of the location of a benchmark point of the moving medium with respect to two coordinates of a fixed reference point, a measuring system forming signals representative of the skew of a straight line which is the benchmark of the moving medium with respect to a fixed reference direction, a computational system which upon receiving the coordinate and skew signals forms signals representing the origin coordinates of the scanning lines and of the skew of these lines, and a generator controlling the scan by means of the beam as a function of the signals of coordinates of origin and of skew transmitted to it by the computational system.

The equipment also includes a measuring system for forming representative signals of at least one of the dimensions of the medium and for transmitting them to the computational system.

Measuring the coordinates of the benchmark point is achieved using a line of detectors partly occulted by the medium and by means of an encoder associated with the transport. The skew measurement is obtained by determining a time-representative parameter for the time elapsing between the passings of the benchmark straight line at the level of two detectors spaced transversely to the moving direction of the medium. The dimensional measurement is obtained by means of at least two partially occulted detector lines.

In the case of paper money checking equipment, the benchmark point is the corner of the engraving of the bill being verified and the transport advantageously is a cylinder on which the bills are kept by suction. Synchronization of all operations is obtained by an encoder transmitting large numbers of pulses. The overall data processing is digital.

Other characteristics and advantages of the invention will be evident from the following description in relation to the attached drawings, in which:

FIG. 1 is a partially schematic diagram of equipment and process of the invention for checking paper money;

FIGS. 2a and 2b are schematic views illustrating the skew measurement of a bill while it moves for inspection;

FIG. 5 is a schematic view illustrating the computation of the skew of the scanning lines;

Figure 3:
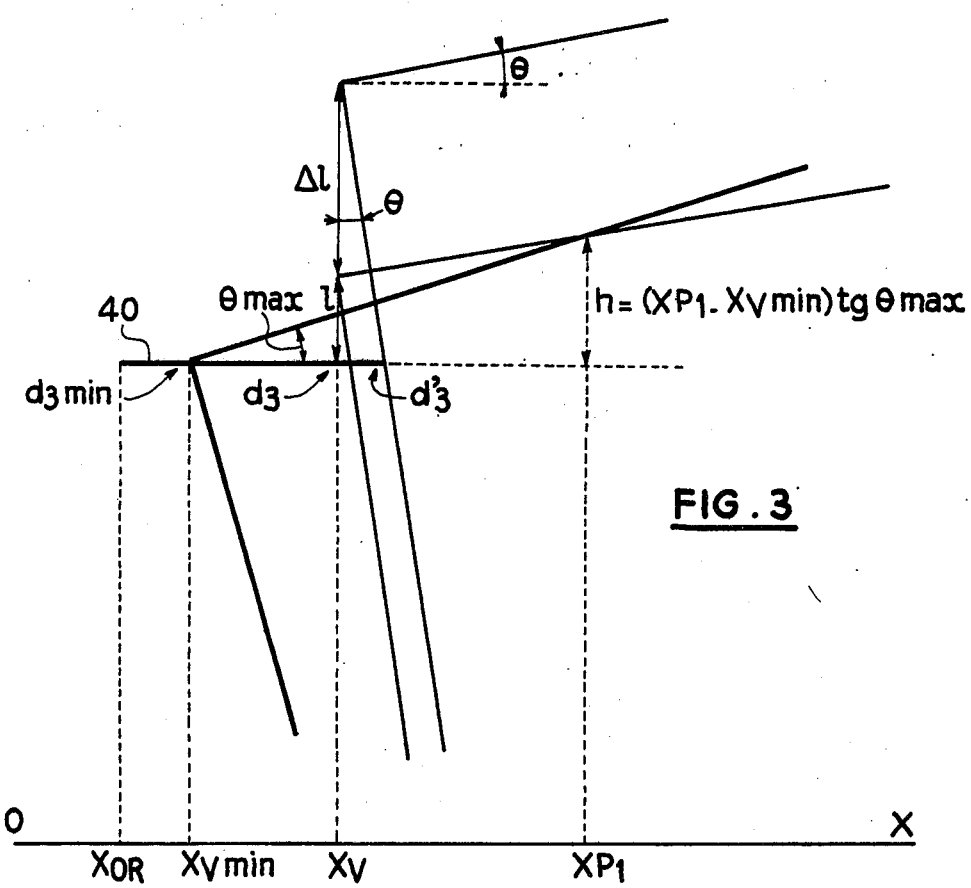
FIG. 3 is a schematic view showing the relative position of a bill and of various detectors and various parameters of the invention.

Referring now to the drawings, the equipment shown in FIG. 1 detects fabrication defects in the paper money, for instance poor color superposition, the presence of spots or stains or various anomalies, etc. Analysis is achieved by detecting the light diffused by the bill according to the three basic color components (blue, green, and red). The equipment of FIG. 1 comprises at least one laser 10 transmitting an analyzing beam to two deflecting devices 12 and 14 (deflector x and deflector y) controlling the scanning of a bill or note 16 by the laser beam. The light diffused by the bill reaches a photomultiplier 18. A photocell 20 is located in the path of the laser beam and controls a modulator 23 by means of a feedback loop, the latter comprising an amplifier 22 to ensure that the laser beam is always of the same intensity at the position of bill 16, regardless of the deflection caused by deflectors 12 and 14.

Bill 16 is positioned on a cylinder 24 where it is maintained by suction (the suction means not illustrated). An encoder 26 is mounted on the shaft of cylinder 24. Systems omitted from FIG. 1 but described in detail further below operate in concert with the angular encoder in the detection of the position of bill 16, as denoted by element 28. The signals from photomultiplier 18 are put into numerical form by an analog-digital converter 30. Further, deflectors 12 and 14 are controlled by a logic scanning circuit 32. Components 28, 30, and 32 exchange data with a computation system 34 by means of interface circuits 36 and 38.

The results obtained by analyzing bill 16 are compared by a suitable circuit with the corresponding values from a standard bill. This comparison for instance may be achieved on one hand by using small area elements of the bill to detect point defects, and on the other hand using larger areas of the bill to detect of the lesser amplitudes but greater extent, for instance slight variations in the intensity of a color. A particularly advantageous example of bill comparison with a standard bill is described in the above-cited French patent application 72.27445.

Laser 10 will be different, depending on the wavelength of the light it must transmit. It for instance the light is red, it will be advantageously a helium-neon laser. Deflectors 12 and 14 are of an acoustic-optic type, as is modulator 23. Interface circuits 36 and 38 are coupled to computation system 34.

The digital converter 30 converts the amplitude of the input signal of photomultiplier 18 into a digital form of sixteen levels (four bits).

Bill 16 is moved by controlling transport drum surface 24 at a speed of the order of 6 meters/sec. Its comparison with a standard bill requires accurate determination of the relative positions of bill 16 and of the scanning lines. The scanning lines therefore must be controlled as a function of the offset of the drawing from its theoretical position. For this reason the laser beam used for scanning is subjected to an acoustic-optical deflection along two orthogonal directions, this control being a saw-tooth waveshape.

In the special case of the bill being about 100 mm wide and the analysis range being 1 mm, the duration of one scanning line is 167 microseconds. If each line comprises 100 analysis points, the signal from photomultiplier 18 must be sampled at a frequency of about 600 kHz.

Under these conditions, comparing two bills by means of 16 significant levels for each point of analysis requires a change in relative position between spot and engraving less than 1/16 mm when the engravings of the compared bills are located in arbitrary manner within definite limits. Thus, the arrangement of bill 16 on transport 24 may be obtained within ±2 mm and a skew of ±2°. Consequently the position of the engraving must be precisely measured both in translation and in rotation, and the analyzing spot must be accurately positioned.

This accuracy of 1/16 mm may be achieved by measuring the position of the engraving to within 1/32 mm and by controlling the analyzing spot to within 1/32 mm.

The position of the engraving is determined using the angular encoder 26. The skew of the engraving is measured using two photocells $P_1$ and $P_2$ shown in FIGS. 2a and 2b and located on a generatrix of the cylinder defining transport 24. The position of the upper left corner of the engraving is measured using a line detector in the form of a photodiode strip "Reticon"[1] shown in FIG. 3.

[1] "Reticon" is the trade name for Reticon Corporation, 365 Middle Field Road, Mountain View, Calif.

The measurement of the bill displacement in the direction of motion along the circumference of cylinder 24 of the transport will now be considered in greater detail. Encoder 26, mounted on the shaft of cylinder 24, is an angular encoder yielding or generating 18,000 points per revolution. The transmitted pulses are electronically multiplied by four so that the encoder's resolution is 72,000 points a revolution. On one hand the encoder transmits one pulse per revolution triggering the measurement process, and on the other hand it emits 72,000 pulses per revolution, constituting the scanning synchronization clock.

In a special case, the cylinder circumference is 720 mm so that the encoder transmits 100 pulses for each mm in the direction of cylinder motion, or 1 pulse per mm along the scanning line when it comprises 100 points. The corresponding frequency for a speed of 6 meters per second is 600 kHz. This frequency will be denoted by $F_o$ hereafter.

The measurement of the engraving's skew with respect to a direction perpendicular to its advance motion will now be considered in greater detail. To that end two photocells $P_1$ and $P_2$ are used, which are shown in FIGS. 2a and 2b, an imaginary line joining them being parallel to a cylinder generatrix. These photocells detect the beginning of the engraving. They are spaced a distance d apart. The equipment counts the number n of encoder pulses of clock frequency $F_o$ between detection by cells $P_1$ and $P_2$. If $P_{enc}$ is the encoder pitch (about 1/100 mm), one obtains $\tan \theta = nP_{enc}/d$.

The occultation sequence of the two cells determines the algebraic sign of angle $\theta$. The angle $\theta$ will be considered positive if cell $P_2$ is occulted prior to cell $P_1$. The distance between these two cells, for instance, is about 5 cm. The extent of the skew allows the offset of the scanning line along the engraving. For instance, if the origin error of the scanning line must remain within 1/32 mm at the last scanning line, in particular after 15 cm as regards one example, the distance covered by the engraving between the passages above cells $P_1$ and $P_2$ must be known within 1/100 mm. The angle $\theta$ being restricted to ±2°, $\theta$, $\sin \theta$, and $\tan \theta$ may be set equal while remaining within the required accuracy.

In an ideal case the imaginary line joining cells $P_1$ and $P_2$ represents a cylinder generatrix. Nevertheless precise control is unnecessary because the computational system can correct a systematic position error of the two cells. When the two cells $P_1$ and $P_2$ are a distance d, about 5 cm apart, and when the bill is at maximum skew (2°), the maximum number of pulses is equal to 175. This value may be stored for instance in an 8-bit register, which has a capacity of 256 bits.

Presently the measurement of the lateral position of an engraving benchmark point will be considered in greater detail, in particular the upper left corner. Measurement is achieved by a line of photodetectors formed by the above-cited strip of 128 "Reticon" photodiodes of which the position is indexed to that position designated by reference numeral 40 in FIG. 3. This position 40 actually is that of the image of the photodiode strip formed by an objective for the purpose of this strip covering a distance of 4 mm on the bill and, thus, providing an accuracy of 1/32 mm.

Figure 4:
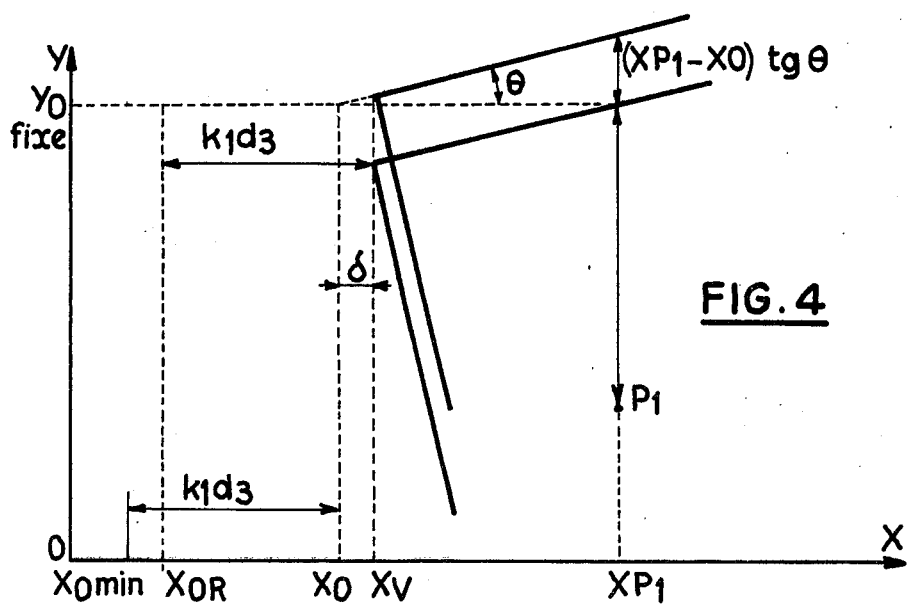
FIG. 4 is a schematic view similar to FIG. 3.

FIGS. 3 and 4 represent various parameters used in the computations below. The distances are taken along the OX axis from an origin corresponding to the O state of a digital-analog converter X. In FIG. 3, $X_{or}$ represents the abscissa of the origin of strip 40 on the bill; $X_{p1}$ is the abscissa of cell $P_1$; $d_3$ is the number of photodiodes in strip position 40 that are not occulted at the time the upper left corner of the bill is passing; $X_y$ is the abscissa of the upper left corner of the drawing.

Under these conditions, there follows $X_y = X_{or} + k_1 d_3$ where $k_1$ is the spacing of the photodiodes on the bill.

The photodiode strip is read by scanning, that is, the reading is not instantaneous, and actually it is not the number $d_3$ which is read, but a number $d'_3$ from which $d_3$ is computed if the angle $\theta$ is known. Scanning of the strip is triggered after the bill has covered a fixed distance following the occultation of cell $P_1$ by the engraving. This distance corresponds to a certain number of beats from clock $F_o$. In practice the strip under consideration must be erased to such an extent that the measurement is obtained only during the second scanning. The scanning frequency of the strip is sufficiently high so that the difference between $d'_3$ and $d_3$ is less than unity.

The determination of the angle of the scanning lines will now be considered when the equipment does not ascertain the dimensional variations of the bill. The analyzing spot from the laser is required to cross the moving bill along a straight line parallel to the upper edge of the drawing or engraving on it. The scanning line must subtend, with respect to a cylinder generatrix, an angle $\alpha = \theta + k$, where k is a positive angle. If $P_{scx}$ denotes the scanning spacing X (that is, the displacement of the spot for one converter increment, or about 1/32 mm) and if $P_{enc}$ denotes the encoder spacing (about 1/100 mm), an advance of the spot of $(32) \times (P_{scx})$ is obtained when the cylinder advances by one encoder spacing, where $$\alpha = \theta + (P_{enc}/32\ P_{scx})$$

Presently the generation of a scanning line of angle alpha will be considered. A scanning line is determined by its angle alpha and its origin $x_o$, $y_o$. Triggering the first scanning line is obtained by counting down a number $N_1$ of clock pulses from the time of occultation of cell $P_1$ by the engraving on the bill. This number $N_1$ is a function of $\theta$ and $d_3$. The origins of the succeeding lines are shifted as a function of $\theta$ so that the relative position of each line with respect to the engraving edge is fixed and the line-to-line spacing is constant.

Figure 6:
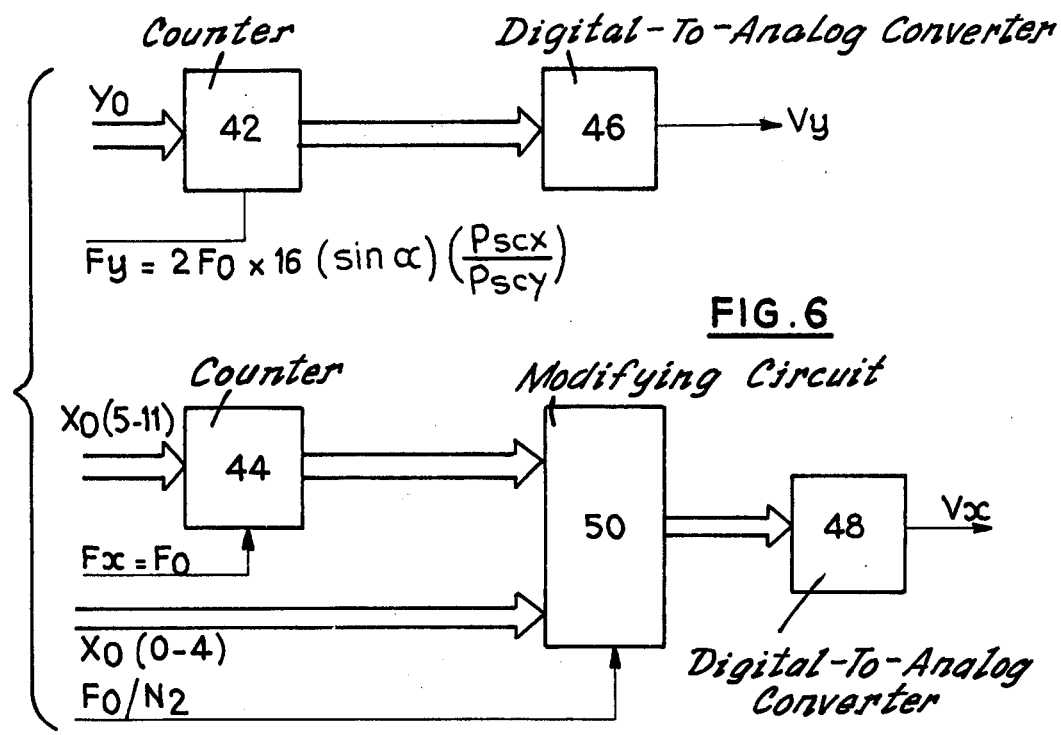
FIG. 6 is a schematic view of a closed addition circuit used in the equipment of the invention.

FIG. 5 shows diagrammatically a scanning line of length L. The computational system 34 transmits the coordinates of the origin $x_o$, $y_o$. Saw-tooth potentials $V_x$ and $V_y$ required for scanning are shaped by means of the circuit shown in FIG. 6. This circuit comprises a $(Y_o)$ counter 42 and a $(X_o)$ counter 44. Digital to analog converters 46 and 48 transmit the analog potentials $V_y$ and $V_x$. The circuit of FIG. 6 is asymmetrical for paths Y and X because the frequency $F_y$ depends on the sine of alpha, hence on alpha, whereas the frequency $F_x$ depends on the cosine of alpha which is close to unity. Element 50 indicates a circuit for modifying by unity the digital value transmitted to converter 48 by means of the control of the computational system as a function of the magnitude of the angle alpha. Thus the number of clock beats of clock $N_2$ between two corrections is proportional to $1/16\ \alpha^2$.

Figure 7:
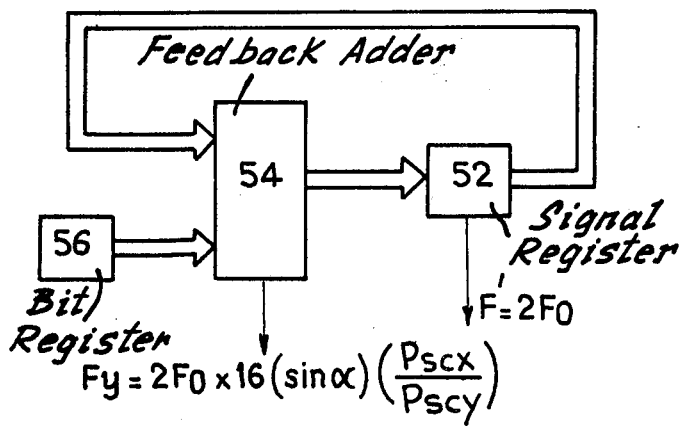
FIG. 7 is a schematic view of a circuit employed in the apparatus.
Figure 8:
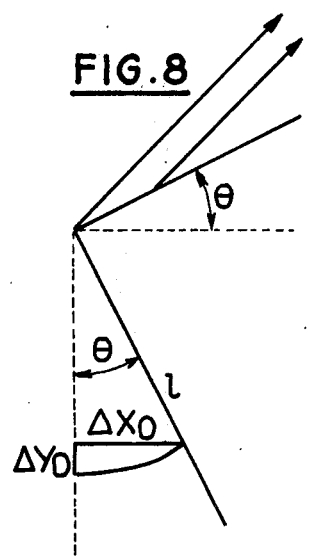
FIG. 8 is a diagram illustrating the computation of the origins of the scanning lines.

Frequency is obtained from the formula -

$$F_y = 2F_o \times 16 \times \sin \alpha \times P_{scx}/P_{scy}$$

for the circuit shown in FIG. 7. This circuit comprises a register 52 receiving a signal of frequency $F'=2F_o$ and the signal from an additional feedback adder 54. The latter also receives the stored value from a 9-bit register 56 corresponding to a reference value. The adder also provides multiplication by an arbitrary factor less than unity. It is clear that these last circuits are merely illustrative and that other compensatory types are possible.

Presently the determination of the first scanning line of the trigger time will be considered. Consider that $Y_o$ is fixed and that $$X_o = X_v - \delta = k_1 d_3 \times X_{or} - \delta$$

where $k_1$ is the spacing of photodiode strip on the bill as previously indicated, $\delta$ is a parameter shown in FIG. 4 and representing the distance between the beginning of the line and the edge of the engraving.

It will be noted that under these conditions and when the first scanning line must intersect again the upper left corner of the engraving, as shown in FIG. 4, it must be triggered after the drawing has covered a distance D equal to $$D = D_o \times (X_{p1} - X_o) \tan \theta - \delta V_t / V_b$$

from cell $P_1$ and line $Y = Y_o$, $Y_b$ being the scanning speed, which is about 100 times that of the advance motion $V_t$ of the bill.

The number of clockbeats $F_o$ corresponding to distance D is $N_1 = D/P_{enc}$. However, the first scanning line need not precisely reintersect the drawing's upper left corner. It is enough to determine $x_o$ and D within a constant. In this case $y_o$ is fixed; $x_o = k_1 d_3 + x_{o\ min}$; $N_1 = D/P_{enc} = (x_{p1} - x_o)/P_{enc}$ because $\theta = nP_{enc}/d$, $N_1 = n(x_{p1} - x_o)/d +$ constant.

The determination of the consecutive scanning lines will now be considered. Let $l$ represent the line-to-line space and $N_o$ the number of clock beats $F_o$ corresponding to one scanning line, then the frequency is $f = F_0/N_o$, the line-to-line spacing being $l = N_o P_{enc}$.

The offset of the origin from one line to the next is given by $$\Delta x_o = l \sin \theta; \ \Delta y_o = l(1 - \cos \theta).$$

This shift is provided automatically without the intervention of the computational system. Latter provides the value of $\Delta x_o$ (by loading into an 8-bit register the value $256 N_o P_{enc}(\sin \theta)/P_{scx}$; the shift frequency of the origin of the x's by one spacing $P_{scx}$ is $f_n = f\Delta x_o / P_{scx} = fl \sin \theta / P_{scx}$), and the number of lines $N_3$ between two spacing corrections $P_{scy}$ as regards $\dot{y}_o$. $N_3$ is given by the formula $N_3 = (2P_{scy})/(N_o P_{enc}\theta^2)$, the value actually being used being the nearest integer.

The operation of the described equipment will now be considered in the light of taking a measurement. This is done in four stages. The first stage is the measurement of the bill position. The computational system reads the n and $d_3$ values in the program mode upon interrupts. Thereupon in the second stage the computational system determines the scanning parameters. In the general case, it performs the following calculations:

$$\sin \theta = \theta = \pm \frac{n \times P_{enc}}{d}$$

$d_3 = d'_3 - \theta/k_1 [(V_T/f_R) d'_3 - d_3$
$min + (X_{P1} - X_{OR} - k_1 d_3$
$min)\theta_{max} - (X_{P1} - X_{OR} - k_1 d'_3)\theta]$ (nearest integer)

$$\sin \alpha = \alpha = \theta + \frac{P_{enc}}{32 \times P_{scx}}$$

$X_o = k_1 d_3 + X_{omin}$ $$N_1 = \frac{(X_{P1} - X_o)n}{d} + \text{constant (nearest integer)}$$

$$N_2 = \frac{1}{16\alpha^2}, N_3 = \frac{2 \times P_{scy}}{N_o \times P_{enc} \times \theta^2} \text{(nearest integer)}$$

The operations obviously are simpler if there is no skew present.

The third measuring stage is the loading of the registers controlling the scanning. They are loaded in the program mode by means of the interface circuits 38 of FIG. 1.

The fourth stage is the point-by-point scanning of a bill. The data arrive directly in the channel mode at the proper circuit by means of the interface circuit 36.

The above-described equipment may be modified in order to compensate for any dimensional variations in the engravings on the bills due, for instance, to hydrometric changes. To that end a modification of the equipment comprises two detector lines in the form of "Reticon" photodiode strips located either side of the engraving. In the special case of paper money verification, these strips allow measuring the width of the margins and of the engravings. Measurement of length is performed by cell $P_1$ operating in concert with the encoder transmitting the pulses of clock frequency $F_o$.

The information relating to the width so obtained modifies the x-scanning. The correction is cumulative with that already achieved as a function of the cosine of alpha.

The length information modifies the line-to-line spacing. This correction is cumulative with that already obtained as a function of the cosine of alpha. These operations are implemented by means of circuits of the kind previously described, in particular a feedback adder of the type shown in FIG. 7.

Even though the apparatus has been shown for verifying paper money, comprising the variables of position, skew, and dimensions of the bills, simpler apparatus may deal only with some of these parameters (omitting for instance variations in dimensions or skew). Such simpler apparatus and other modifications obvious to one skilled in the art are intended to be within this invention.

It is claimed:

1. A process for parallel-line scanning of a moving data medium such as a paper bank note by means of a beam, said medium being transported with a definite speed, including the steps of measuring two coordinates of the location of a benchmark point of the moving medium with respect to two coordinates of a fixed point of reference, measuring the skew of a benchmark of the moving medium with respect to a fixed direction, computing the coordinates of the origin of a first scanning line from the coordinates of said benchmark point and according to the skew of said benchmark, computing the coordinates of the origins of the other scanning lines from the spacing desired between consecutive scanning lines and the origin of a previous scanning line and according to the skew of said benchmark, computing the skew of scanning lines according to the skew of the benchmark, scanning said medium so that the consecutive lines begin at the origins with the computing coordinates and are of the computed skew.

2. Process as defined in claim 1, including the additional steps of measuring at least one dimension of the moving medium, comparing the value so obtained with a set value, and adjusting said spacing between scanning lines according to the result of comparison.

3. Process as defined in claim 1 wherein the measurement of the coordinates includes transporting said medium in front of a line sensor comprising several detectors, and determining the detectors which are occulted by said moving medium and those which are not.

4. Process as defined in claim 1, wherein the skew measurement includes transporting said medium in front of two detectors placed in a direction essentially perpendicular to that of the motion of the medium, generating pulses according to displacement of said data medium, and counting a number of pulses representative of the displacement of the moving medium between the occultations of the two detectors.

5. Process as defined in claim 1, wherein the step of scanning includes generating first signals for controlling a first system for deflecting the beam along a first direction, and generating second signals for controlling a second system for deflecting the beam along a second direction which is orthogonal of the first direction.

6. Apparatus for the parallel line scanning of a moving medium such as a bank note using a beam, including a medium transport, a measuring system for generating signals representative of two coordinates of the location of a benchmark point on the moving medium with respect to two coordinates of a fixed reference point, a measuring system for generating signals representing the skew of a benchmark straight line of the moving medium with respect to a fixed reference direction, a computational system for computing the coordinates of the origin of a first scanning line from the coordinates of said benchmark point and according to the skew of said benchmark, for computing the coordinates of the origins of the additional scanning lines from the spacing desired between consecutive scanning lines and the origin of a previous scanning line and according to the skew of said benchmark, and for computing the skew of scanning lines according to the skew of the benchmark, and a generator controlling the scanning by beam as a function of signals of the coordinates of the origins and of the skew transmitted to it by the computational system.

7. Apparatus of claim 6, including measuring system for generating signals representing at least one dimension of the medium and for transmitting them to the computational system.

8. Apparatus of claim 6, wherein the measuring system of the coordinates of the benchmark point comprises a line of detectors.

9. Apparatus of claim 6, wherein the skew measuring system senses the passing of the benchmark straight line at the level of two detectors spaced in a direction essentially perpendicular to the motion of the moving medium.

10. Apparatus of claim 8, wherein the measuring system for the medium dimensions comprises two lines of detectors.

11. Apparatus of claim 6, wherein the beam is a light beam from a laser.

12. Apparatus of claim 6, wherein the moving medium is a paper note, the benchmark point is a corner of the note's engraving, and the benchmark straight line is an edge of the engraving.

13. Apparatus of claim 6, wherein the medium transport is a cylinder to which the medium is adhered by suction.

14. Apparatus of claim 6, including an encoder generating pulses representing transport speed, and wherein the measuring systems transmit digital signals, the computational system performs digitally and all operations are synchronized by the pulses from said encoder.

* * * * *